United States Patent
Chan et al.

(10) Patent No.: US 8,015,062 B2
(45) Date of Patent: Sep. 6, 2011

(54) MARKETING PROFILE STORE

(75) Inventors: Victor S. Chan, Thornhill (CA); Lev Mirlas, Thornhill (CA); Danny Yiu, Markham (CA)

(73) Assignee: International Business Machines Corporation, Armonk, NY (US)

( * ) Notice: Subject to any disclaimer, the term of this patent is extended or adjusted under 35 U.S.C. 154(b) by 2688 days.

(21) Appl. No.: 10/773,496

(22) Filed: Feb. 6, 2004

(65) Prior Publication Data

US 2004/0260624 A1  Dec. 23, 2004

(30) Foreign Application Priority Data

Jun. 17, 2003  (CA) ..................... 2432484

(51) Int. Cl.
*G06Q 30/00*  (2006.01)
(52) U.S. Cl. .................................. 705/14.51
(58) Field of Classification Search ............ 705/14
See application file for complete search history.

(56) References Cited

U.S. PATENT DOCUMENTS

| | | | |
|---|---|---|---|
| 5,955,710 A * | 9/1999 | DiFranza | 187/396 |
| 6,466,975 B1 | 10/2002 | Sterling | 709/223 |
| 6,968,499 B1 * | 11/2005 | Minami et al. | 715/500 |
| 7,120,592 B1 * | 10/2006 | Lewis | 705/26 |
| 7,136,871 B2 * | 11/2006 | Ozer et al. | 707/104.1 |
| 7,158,943 B2 * | 1/2007 | van der Riet | 705/14 |
| 7,313,622 B2 * | 12/2007 | Lee et al. | 709/227 |
| 7,315,983 B2 * | 1/2008 | Evans et al. | 715/713 |
| 2002/0002488 A1 | 1/2002 | Muyres et al. | 705/14 |
| 2002/0023004 A1 | 2/2002 | Hollander et al. | 705/22 |

FOREIGN PATENT DOCUMENTS

WO  WO0129716 A2 *  4/2001

* cited by examiner

*Primary Examiner* — John G. Weiss
*Assistant Examiner* — Darnell Pouncil
(74) *Attorney, Agent, or Firm* — Winstead, P.C.

(57) ABSTRACT

A method and a system for providing content on a computer having a memory, a display having at least a viewable position and networking capabilities for communicating with other computers in a networked system is provided. A storepath establishes the relationship amongst related stores having various marketing assets. Each marketing asset has its display attributes as defined by a global marketing campaign. When viewing a store profile, marketing assets are displayed in the viewable position on the display in accordance with those attributes.

8 Claims, 21 Drawing Sheets

FIG. 7

WebSphere Commerce Accelerator - Microsoft Internet Explorer fulfillment 001 - store01 - United States English    Logout-->Home-->CampaignInitiatives Store   Sales   Marketing   Products   Logistics   Reports   Help Campaign Initiatives View [All ▼]

Page Number [   1] [Go]

<< First 1 of 1 Last >>

1 item

| ☐ Name | Description | ▼ Campaign | ▼ Status |
|---|---|---|---|
| ☑ CampaignInHostedStore | | | Active |

[New...] [Change] [Summary] [Duplicate...] [Resume] [Suspend] [Statistics] [Delete]

WebSphere Commerce Accelerator - Microsoft Internet Explorer fulfillment 001 - Supplier Profile - United States English    Logout-->Home-->CampaignInitiatives Marketing  Help Campaign Initiatives View  [All ▼] —— *502*

0 items

Page Number [  1 ] [Go]

<< First 1 of 1 Last >>

| ☐ Name | Description ▼ | Campaign ▼ | Status ▼ |

There are currently no campaign initiatives to list. To create one, click New.

- New...
- Change
- Summary
- Duplicate...
- Resume
- Suspend
- Statistics
- Delete

FIG. 10

WebSphere Commerce Accelerator - Microsoft Internet Explorer fulfillment 001 - Supplier Profile - United States English    Logout-->Home-->CampaignInitiatives Marketing   Help Campaign Initiatives View [All ▼]

1 item

| ☐ Name | Description | ▼ Campaign | ▼ Status ▶ |
|---|---|---|---|
| ☑ CampaignInParentStore | | | Active |

504 — (points to CampaignInParentStore)
508 — (points to Description area)

Page Number [ 1 ] [Go]

<< First 1 of 1 Last >>

Buttons: New... | Change | Summary | Duplicate... | Resume | Suspend | Statistics | Delete

WebSphere Commerce Accelerator - Microsoft Internet Explorer fulfillment 001 - store01 - United States English    Logout-->Home-->CampaignInitiatives Store   Sales   Marketing   Products   Logistics   Reports   Help Campaign Initiatives View [All ▼]

2 items

Page Number [  1] [Go]

<< First 1 of 1 Last >>

| ☐ Name | Description | ▼ Campaign | ▼ Status |
|---|---|---|---|
| ☐ CampaignInHostedStore | | | Active |
| ☑ CampaignInParentStore | | | Active |

New...
Change
Summary
Duplicate...
Resume
Suspend
Statistics
Delete

FIG. 12

WebSphere Commerce Accelerator - Microsoft Internet Explorer   _ □ X fulfillment 001 - store01 - United States English          Logout-->Home-->CampaignInitiatives Store  Sales  Marketing  Products  Logistics  Reports  Help Campaign Initiatives                                                    400

View [All ▼]                           Page Number [  1 ] [Go]
2 items                                << First 1 of 1 Last >>

| ☐ Name | ▶ Description | ▶ Campaign | ▶ Status ▶ |
|---|---|---|---|
| ☐ CampaignInHostedStore | | | Active |
| ☑ CampaignInParentStore | | | Active |

408    508
404                              477

Web Page Dialog                                              X
  ⚠ The selected row cannot be modified because it does not belong to the store
     for which you have logged in
                            [ OK ]

[New...]
[Change]
[Summary]
[Duplicate...]
[Resume]
[Suspend]
[Statistics]
[Delete]

FIG. 13

WebSphere Commerce Accelerator - Microsoft Internet Explorer fulfillment 001 - store01 - United States English     Logout-->Home-->CampaignInitiatives Store   Sales   Marketing   Products   Logistics   Reports   Help Campaign Initiatives     Page Number [ 1 ] Go View [ All ▼ ]     << First 1 of 1 Last >>

2 items

| ☐ Name | ▼ Description | ▼ Campaign | ▼ Status ▶ |
|---|---|---|---|
| ☐ CampaignInHostedStore | | | Active |
| ☑ CampaignInParentStore | | | Active |

— 408 (Description)   508   404

— 477

Web Page Dialog   [X]

⚠ The selected row cannot be modified because it does not belong to the store for which you have logged in

[ OK ]

New...
Change
Summary
Duplicate...
Resume
Suspend
Statistics
Delete

| WebSphere Commerce Accelerator - Microsoft Internet Explorer | □|□|☒ |
|---|---|
| fulfillment 001 - Supplier Profile - United States English | Logout-->Home-->E-MarketingSpots |

Marketing  Help e-Marketing Spots

Page Number [ 1 ] [Go]

<< First 1 of 1 Last >>

1 item

| ☐ Name | ▼ Description | ▼ Campaign | ▼ Status | ▼ |
|---|---|---|---|---|
| ☐ ESpotInParentStore | | | Active | |

- New...
- Change
- Summary
- Schedule
- Delete

600 — (figure label)
608 — (callout to Description column)
604 — (callout to row)

FIG. 15

WebSphere Commerce Accelerator - Microsoft Internet Explorer   □|☐|✕ fulfillment 001 - Supplier Profile - United States English    Logout-->Home-->E-MarketingSpots>CampaignIniativeScheduling Marketing   Help Campaign Initiative Scheduling 0 items

| ☐ Campaign Initiative | Start Date ▼ | End Date ▼ |
|---|---|---|

New...
Change Initiative
Delete

Page Number [ 1 ] Go

<< First 1 of 1 Last >>

There are currently no campaign iniaitive schedulings to list. To create one, click New. — 701

WebSphere Commerce Accelerator - Microsoft Internet Explorer fulfillment 001 - Supplier Profile - United States English    Logout-->Home-->E-MarketingSpots>CampaignIniativeScheduling Marketing   Help Campaign Initiative Scheduling 1 item

| ☐ Campaign Initiative | Start Date ▼ | End Date ▼ |
|---|---|---|
| ☐ CampaignInParentStore | May 12, 2003 12:12 PM | Never |

Page Number [1] Go
<< First 1 of 1 Last >>

New...
Change Initiative
Delete 700
808
706
708
704

FIG. 18

WebSphere Commerce Accelerator - Microsoft Internet Explorer fulfillment 001 - store01 - United States English          Logout-->Home-->E-MarketingSpots Store  Sales  Marketing  Products  Logistics  Reports  Help e-Marketing Spots Page Number [ 1 ] Go << First 1 of 1 Last >>

1 item

| ☐ Name | Description | ▼ Campaign | ▼ Status |
|---|---|---|---|
| ☑ ESpotInParentStore | | | Active |

New...
Change
Summary
Schedule
Delete 900
608
904

FIG. 19

MARKETING PROFILE STORE

CROSS REFERENCE TO RELATED APPLICATIONS

This application claims priority under 35 U.S.C. §119(a) to Canadian Patent Application No. 2432484 filed Jun. 17, 2003, which is hereby incorporated herein by reference in its entirety.

TECHNICAL FIELD

The present invention relates to data processing, and more particularly, to a method of managing information in an e-commerce system.

BACKGROUND INFORMATION

With the advent of e-commerce, business-to-business (B2B) and business-to-consumer (B2C), procurement processes are being moved to the Internet platform for increased speed, widespread reach and efficiency. The Internet provides an optimum forum for accessing and broadcasting a large number of business suppliers and resellers to potential buyers.

Historically, manufacturers and resellers have offered their products in stores. With the advent of e-commerce, the concept of store also finds an extension in the online world, whereby a manufacturer or reseller creates a "virtual store" for conducting its business and allow buyers to purchase or exchange goods or services. These online stores offer a compelling shopping experience for the buyers, and as a result, manufacturers and resellers go through great lengths to ensure that the content of their online business accurately reflects the quantity and quality of the products or services offered.

E-commerce related transactions are typically based on a client/server paradigm 100 as shown in FIG. 1. As understood in the art, the client/server is an architecture in which a client machine 102 (such as a workstation, personal computer, personal digital assistant, cellular phone, etc.) is the requesting machine and an application server 104 is the supplying machine, both of which are interconnected by way of a network 108. The application server 104 is a server computer and includes one or more programs that provide the logic for an online or automated application, and is typically part of a larger, distributed computing system. Application servers 104 are often modeled as a component of a three-tier system which includes a graphical user interface (GUI) server, an application or business logic server, and a resource manager 110 for accessing data stored in databases 106. One such application server 104 is the WebSphere™ product from International Business Machines (IBM). WebSphere™ is available for a number of platforms, including computers from personal computers to high-end main frames running operating systems ranging from Microsoft Windows NT™, to IBM's AIX™, to the open source Linux.

In a typical e-commerce transaction, the client 102 requesting a store operation such as product catalog information interacts with the application server 104 that contains the business logic for synchronizing and managing access to the requested information located at one or more of the databases 106. The clients 102 communicate with the application server 104 through network 108. The network 108 may be an intranet, or the Internet, depending upon the intended geographical reach of the system. The interface (not shown) between the application server 104 and the resource manager 110 may also be an intranet, the Internet, or any other type of proprietary network.

The resource manager 110 stores and retrieves information relating to the store operation on the databases 106 and forwards the requested data from the databases 106 to the application server 104 for further processing, and eventually to the clients 102. The databases 106 are generally co-located with the resource manager 110, and serve as archives of store operation information such as catalogs, product specifications, price lists, product availability and similar types of data typically requisitioned by one of the clients 102.

Frequently, a single virtual store is not sufficient by itself to capture all the go-to-market strategies of a business concern. For instance, a company may have different lines of wares or services, each targeting a different market segment. Also, a company may cross-sell products available by another company, or may share inventory with other stores. As a result, different stores are needed to cater to different marketplaces.

To address these problems, various marketplaces are set up, each comprising a number of stores serving as gathering place of sellers having or offering wares or services. A marketplace may be presented in its entirety as a single domain, with possible divisions between stores. The marketplace home page may include a group of hyperlinks to various store pages, which in turn provide hyperlinks to wares or services offered by each store. The stores may be located on different domain names, and their content may be stored in separate databases.

Regardless of the number of virtual stores or the diversity of the content, from a data management point of view, it is important to ensure that the stores share the same infrastructure so that the same tools can be used to manage the shared and non-shared content among the various stores. However, a major difficulty in existing e-commerce systems is that the stores are typically operated by independently different manufacturers or resellers and use various proprietary protocols, while additional protocols are also being defined by several industry consortia.

Various solutions have been proposed to improve managing and sharing of content and services amongst various stores. A variety of techniques have been proposed in which specific content, such as advertisement, is delivered to a specific audience as described, for example, in U.S. Pat. Nos. 5,636,346, 6,009,410 and 6,182,050. Other techniques involving the scheduling and delivery of advertisements are also described, for example in U.S. Pat. Nos. 5,105,184, 5,937,392, 5,999,912, 6,009,409, 6,026,371 and 6,029,045.

However, the existing solutions are generally not platform-neutral or vendor-neutral, making participation by all resellers in a marketplace impossible. Moreover, the existing solutions are difficult to implement and not all resellers may have the resources required for delivery of tailor-made content on their virtual stores.

SUMMARY

The present invention provides a generic store profile structure for dynamically managing shared and non-shared content of various stores.

Briefly, and in a broad aspect, the present invention provides a method and a system for providing content on a computer having a memory, a display having at least a viewable position and networking capabilities for communicating with other computers in a networked system. A storepath establishes the relationship amongst related stores having various marketing assets. Each marketing asset has its display attributes as defined by a global marketing campaign. When viewing a store profile, marketing assets are displayed in the viewable position on the display in accordance with those attributes.

According to another aspect, delivery of content can be scheduled and limited to a desired set of reseller stores. In a further aspect, the present invention offers a generic platform for various store profiles, which can be dynamically scheduled and updated without resorting to intermediaries or further programming of the store profile.

In a first aspect, the present invention provides for a client/server system having at least a client including a graphical user interface to display a content of virtual hosted stores to a user, the virtual stores being stored in databases managed by a database management system in a resource manager, the graphical user interface being operatively connected to an application server having a business logic module to select the content to be displayed, a method of managing the content of the hosted virtual stores comprising the steps of: (a) creating a profile store which serves as a template and upon which the hosted stores are formatted; (b) designating one or more e-marketing spots in the hosted stores; (c) setting up a marketing campaign for the hosted stores; and (d) creating one or more campaign initiatives in the profile store for the content to be displayed in the hosted stores.

In another aspect, the present invention provides a client/server system for a marketing campaign including a plurality of networked clients each having a graphical user interface to display content of one or more virtual hosted stores to a user viewing a hosted store. The client/server system further comprises an application server operatively connected to the clients through a network, the application server having a business logic module to determine the content to be displayed to the user based on one or more campaign initiatives. A database management system in the client/server system operatively connected to the application server retrieves the content of the hosted stores stored in a database.

In another aspect, the present invention provides a computer program product having a computer readable medium tangibly embodying computer executable code for directing a client/server system having at least a client including a graphical user interface to display a content of virtual hosted stores to a user, the virtual stores being stored in databases managed by a database management system in a resource manager, the graphical user interface being operatively connected to an application server having a business logic module to select the content to be displayed, the computer program product comprising: (a) code for creating a profile store which serves as a template and upon which the hosted stores are formatted; (b) code for designating one or more e-marketing spots in the hosted stores; (c) code for creating a marketing campaign for the hosted stores; and (d) code for creating one or more campaign initiatives in the profile store for the content to be displayed in the hosted stores.

In yet another aspect, the present invention provides a computer data signal embodied in a carrier wave and having means in the computer data signal for directing a client/server system having at least a client including a graphical user interface to display a content of virtual hosted stores to a user, the virtual stores being stored in databases managed by a database management system in a resource manager, the graphical user interface being operatively connected to an application server having a business logic module to select the content to be displayed, the computer data signal comprising: (a) means in the computer data signal for creating a profile store which serves as a template and upon which the hosted stores are formatted; (b) means in the computer data signal for designating one or more e-marketing spots in the hosted stores; (c) means in the computer data signal for setting up a marketing campaign for the hosted stores; and (d) means in the computer data signal for creating one or more campaign initiatives in the profile store for the content to be displayed in hosted stores.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

A better understanding of these and other embodiments of the present invention can be obtained with reference to the following drawings which show by way of example embodiments of the present invention, in which:

FIGS. 5 to 13 are screen shots of the operation of the business logic module which show the sequence of steps for setting up campaign initiatives in an exemplary marketing campaign; and FIGS. 14 to 21 are screen shots of the operation of the business logic module illustrating the sequence of steps for setting up e-marketing spots in an exemplary marketing campaign.

DETAILED DESCRIPTION

Figure 1:
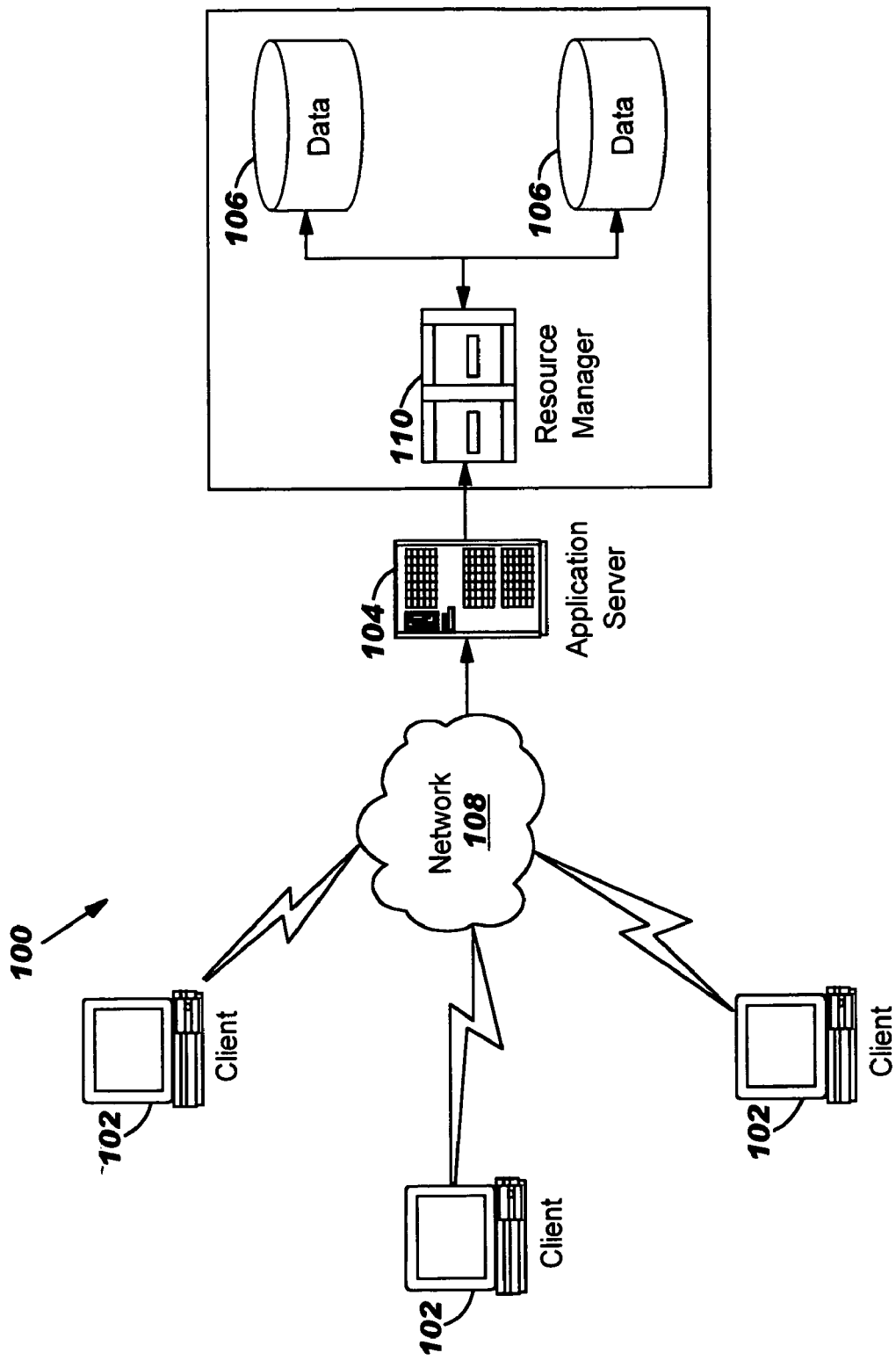
FIG. 1 is a schematic diagram of an exemplary client/server paradigm.

The present invention is now described with reference to the accompanying drawings, wherein like elements are designated by like reference numerals throughout the drawings.

Figure 2:
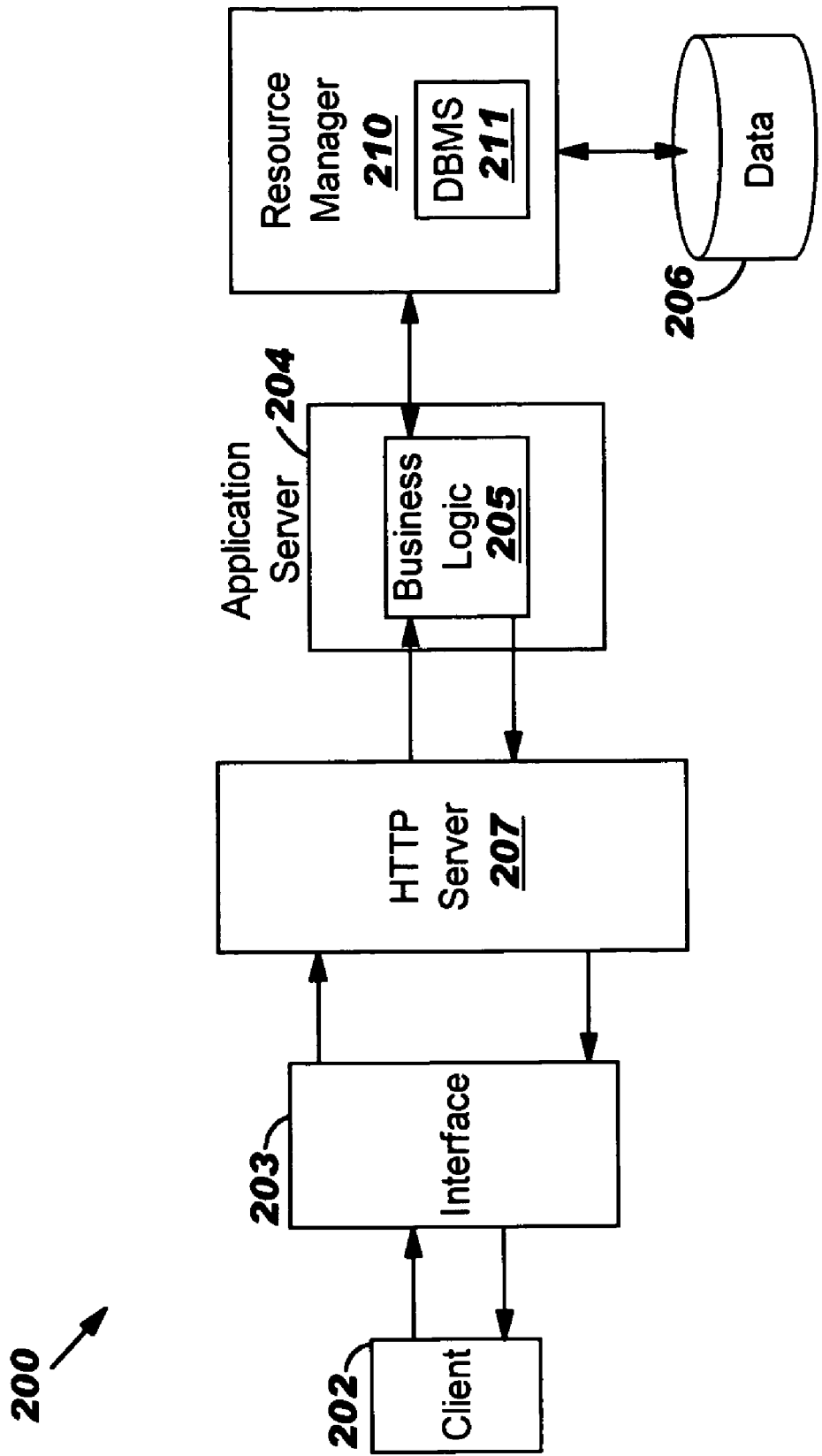
FIG. 2 is a schematic diagram of a web-based client/server system according to an embodiment of the present invention.

Reference is made to FIG. 2 which shows a runtime client/server topology or system 200 in a web-based environment. In the web-based client/server system 200 of FIG. 2, store operations are accessed via Internet protocols. In the web-based client/server system 200 of FIG. 2, access to the contents of an online store stored in databases 206 are also made via Internet protocols. The client/server system 200 includes a client 202 having a Graphical User Interface (GUI) 203 allowing a consumer at the client 202 to interface with an application server 204 to access and browse the contents of the online stores.

The contents of the virtual stores are displayed by the GUI interface 203. The GUI interface 203 comprises a browser system that provides a way to look at, read and hear information on the virtual stores in the web environment. A browser interprets hypertext links and allows the user to view sites and navigate from one Internet node to another. A brief overview of web browsers and their interactions within the web environment is set forth in U.S. Pat. No. 5,774,670, which is incorporated herein by reference. As will be apparent to those skilled in the art, "browsing" refers to a process that describes moving between web page files associated with the virtual stores of the present invention. "Browsing" also refers to browsing the Internet, which is also described in U.S. Pat. No. 5,774,670.

The consumer of the network enters a Universal Resource Locator (URL) into the GUI interface 203 requesting certain store information maintained at that specific URL, and the application server 204 navigates the consumer to the store. A consumer browses the store pages to find information about the desired product or service. The URL is the address of the store accessible on the Internet and contains the name of the protocol required to access the store, a domain name (typically the reseller or manufacturer's domain name) that identifies a specific resource manager 210 on the Internet and a hierarchical description of a file location on the computer. The type of store information at the specific URL depends on the Internet application protocol and could be a HyperText Markup Language (HTML) page, an image file, a program such as a CGI application or Java™ applet. Additional descriptions of URLs can be found in U.S. Pat. No. 5,774,670 and the appendices to U.S. Pat. No. 5,715,314, which are incorporated herein by reference.

Once the consumer's request formulated in the URL is entered into the GUI interface 203, the GUI interface 203 resolves it into a HyperText Transfer Protocol (HTTP) request and sends this request to an HTTP server 207. The HTTP server 207 communicates the consumer's request to the application server 204. At this point, a business logic module 205 of the application server 204 invokes the appropriate procedure to retrieve the requested store information from the database 206 by way of the resource manager 210. The response to the consumer's request is then passed on from the resource manager 210 to the application server 204, and from the application server 204 back to the HTTP server 207, which reformats the response and sends it to the GUI interface 203 for display.

The client/server system 200 allows the functions of the GUI interface 203 and the HTTP server 207 to be separated from the business logic module 205 of the application server 204. The business logic module 205 can be implemented in servlets or Java Server Page (JSP), or by other methods known to those skilled in the art, thereby alleviating the need to resort to custom made proprietary applications to retrieve store asset information.

Figure 3:
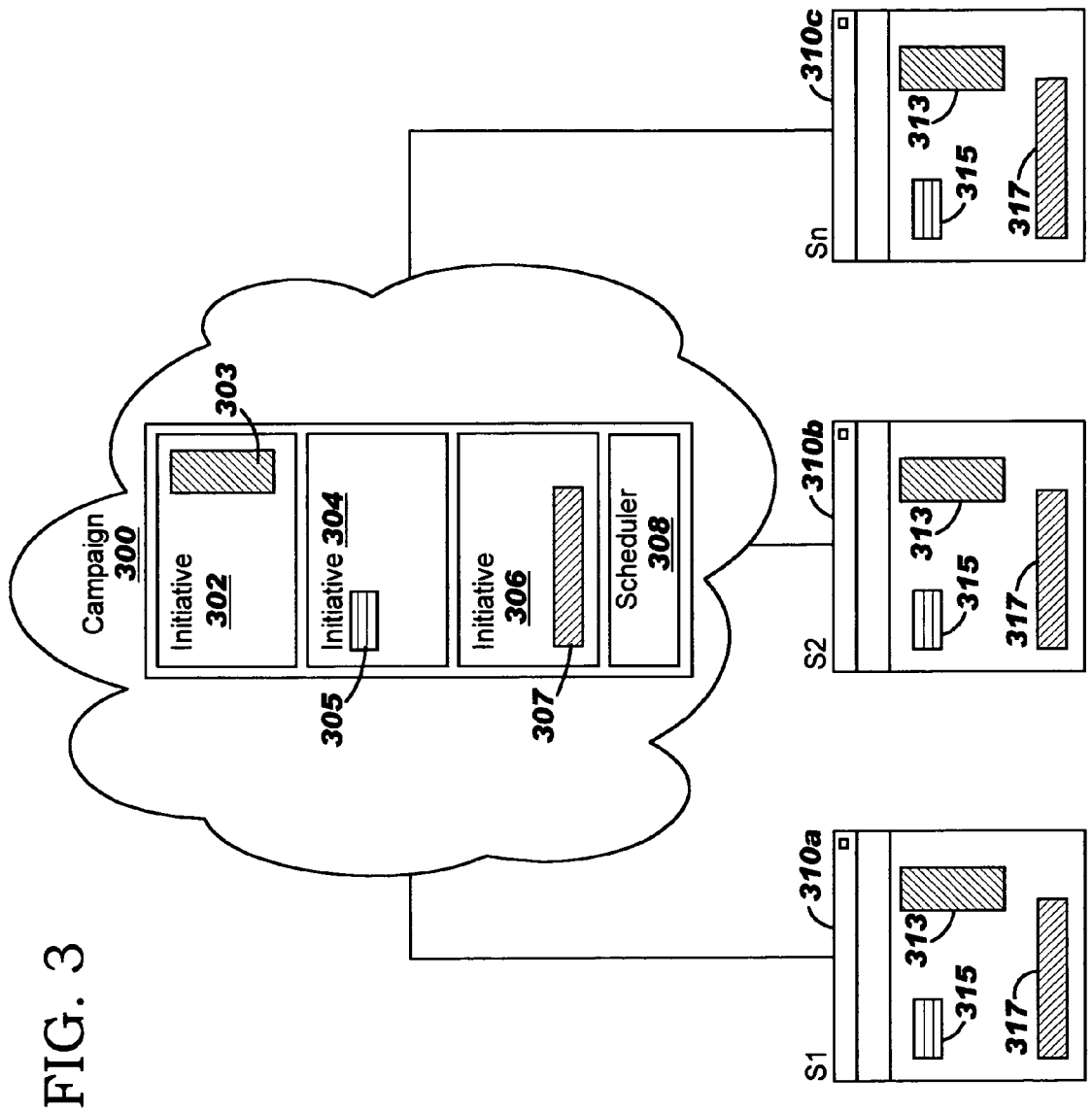
FIG. 3 is a diagrammatic representation of a marketing campaign for participating stores.

FIG. 3 shows the organization of content to be displayed at virtual stores in a particular marketing campaign. As shown in FIG. 3, a number of stores (S1, S2 . . . Sn) 310, indicated individually as 310a, 310b, . . . 310n, participate in marketing campaign 300. The stores 310 are based on a generic profile store. Each store 310 is individually accessed using its URL and comprises information specific to that particular store, as well as a number of e-marketing spots 313, 315, 317 which serve as placeholders for displaying content. The e-marketing spots 313, 315, 317 are displayed to consumers browsing the pages of the store. In an alternative embodiment, the stores 310 may be inter-connected by storepaths, as described in the co-pending patent application entitled "Storepath for Sharing Commerce Assets", filed on Sep. 18, 2003, in the name of the common assignee of the subject application.

As shown in FIG. 3, the marketing campaign 300 includes a number of initiatives 302, 304, 306. The initiatives 302, 304, 306 comprise sets of rules, defining the store operation for stores 310 that can be provided to the consumer participating in the marketing campaign 300. The initiatives generally dictate the specific customer groups to be targeted by the marketing campaign, content components 303, 305, 307 to be displayed in the e-marketing spots 313, 315, 317, and the order of the content components 303, 305, 307 based on variants such as consumer patterns of behavior. The initiatives 302, 304, 306 may be stored in a relational table in the database 206 (shown in FIG. 2). This table may be populated by a database management system, such as the IBM™ DB2, or by other means known to those skilled in the art.

The marketing campaign 300 further includes an initiative scheduler 308 defining the specific duration during which the content components 303, 305, 307 of an initiative 302, 304, 306 are to be displayed. The content components 303, 305, 307 are displayed in the e-marketing spots 313, 315, 317 respectively, based on the rules defined by the initiatives 302, 304, 306 and for time durations in accordance with initiative scheduler 308. The initiative scheduler 308 is part of the business logic module 205 (as shown in FIG. 2) of the application server 204 (as shown in FIG. 2) and may be implemented in Java™, servlet, JSP or other application program interfaces (API)s, as known to a person skilled in the art.

Figure 4:
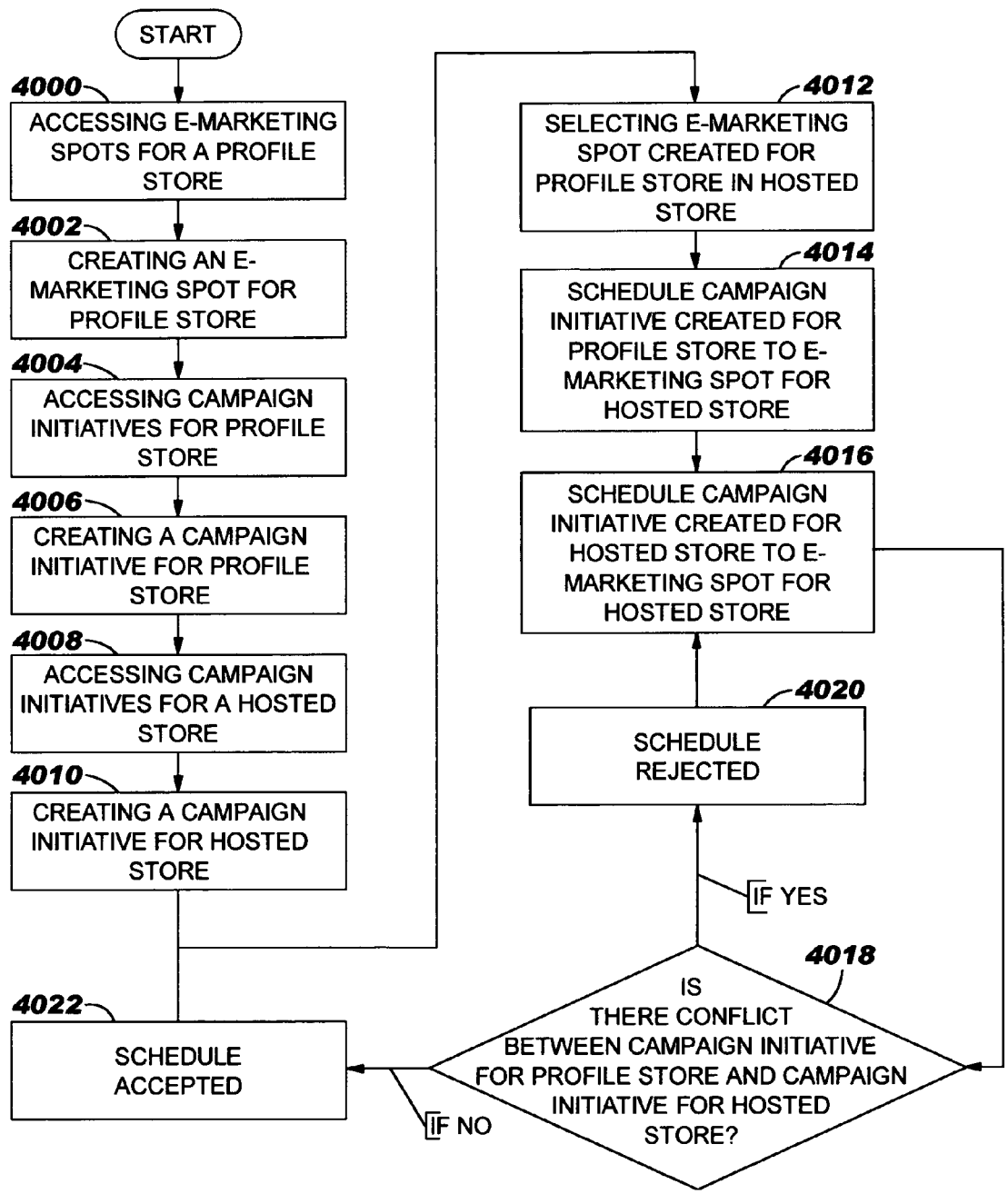
FIG. 4 is a flow chart diagram that illustrates the sequence of steps for populating campaign initiatives in an exemplary marketing campaign.

Referring now to FIG. 4, a sequence of steps for populating campaign initiatives in an exemplary marketing campaign is shown. First, an administrator of a system such as the system 200 shown in FIG. 2 logs on to the e-marketing spot management GUI of the business logic module 205 to create an e-marketing spot for a generic profile store upon which the stores (S1 . . . Sn) 310 (as shown in FIG. 3) are modeled (Step 4000). The administrator creates the e-marketing spot by selecting an e-marketing spot from a list of predefined e-marketing spots (Step 4002). The administrator then accesses the campaign initiatives management GUI of the system 200 (Step 4004) to select one or more campaign initiatives from the campaign initiatives list for the profile store (Step 4006). The campaign initiatives list includes a number of pre-defined campaign initiatives for hosted stores (S1 . . . Sn) 310 participating in a marketing campaign, as shown in FIG. 3.

Once the e-marketing spot and the campaign initiative for the profile store have been created, the administrator then accesses a campaign initiatives list for a particular hosted store S1 310a (Step 4008) to select one or more campaign initiatives for the hosted store S1 310a (Step 4010).

The administrator then selects the e-marketing spot already created for the profile store in Step 4002 to the e-marketing spot in the hosted store S1 310a (Step 4012) and subsequently proceeds to chose a schedule (start/end run time and duration time) for the campaign initiative as selected for the profile store in Step 4006 to this e-marketing spot in the hosted store S1 310a (Step 4014). Similarly, the campaign initiative for the hosted store created in Step 4010 is also scheduled to the same e-marketing spot in hosted store S1 310a (Step 4016).

At this stage, the business logic module 205 (shown in FIG. 2) checks to determine whether a conflict exists between the run time or duration of the campaign initiative for the hosted store S1 310 and the campaign initiative for the hosted store (Step 4018). If a campaign initiative for the profile store having a conflicting time slot or duration has already been scheduled, then the scheduling of the campaign initiative for the hosted store S1 310a is denied and the current schedule is rejected (Step 4020). The administrator must chose a different schedule for the campaign initiative for the hosted store as indicated in Step 4016. However, if no scheduling conflict exists, then the campaign initiative for the hosted store is successfully created and the schedule is accepted (Step 4022). The administrator is then prompted back to Step 4012 to select an the e-marketing spot created in Step 4002 for further scheduling.

Reference is next made to FIGS. 5 to 12, which are screen shots showing the operation of the business logic module 205 (shown in FIG. 2) running on application server 204 (shown in FIG. 2) and in particular illustrating the sequence of steps for setting up campaign initiatives in an exemplary marketing campaign. In one embodiment, the business logic module 205 comprises software that is part of the Commerce Accelerator Tool of an IBM WebSphere™ Application Server, release 5.4 (or higher), being executed on a personal computer platform running Microsoft's Windows NT™ operating system. As is readily apparent to those skilled in the art, many alternate computing platforms, operating systems, and application server suites may be used with the present invention without departing from the scope and nature of the invention, such as UNIX, Linux, IBM's AIX™, Sun Microsystems' Solaris™, or Hewlett-Packard's HP-UX™ operating systems running on common computing platforms such as personal computers, AS/400's, mid-range servers, System 360™ computers, etc.

Figure 5:
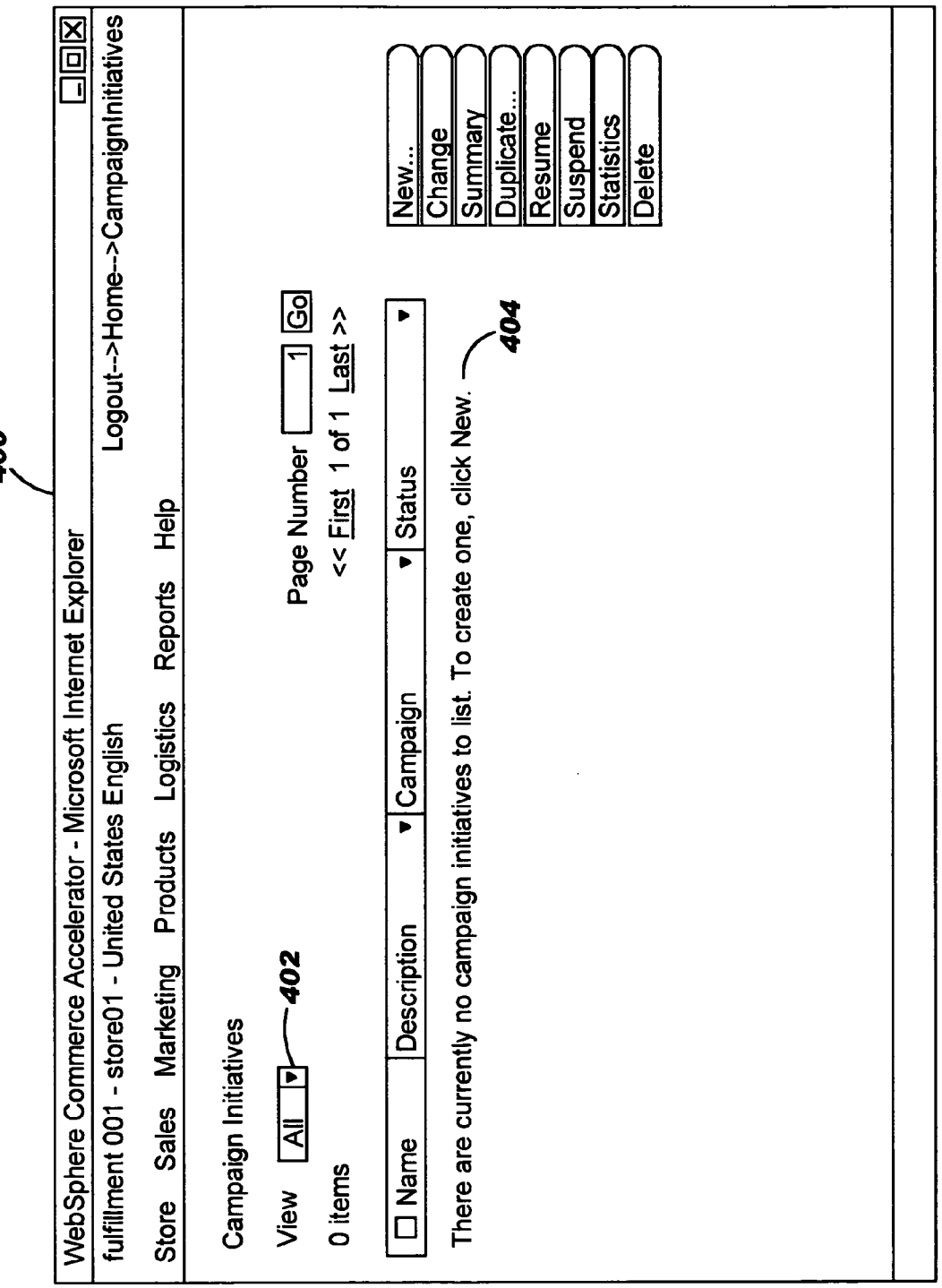
Figure 6:
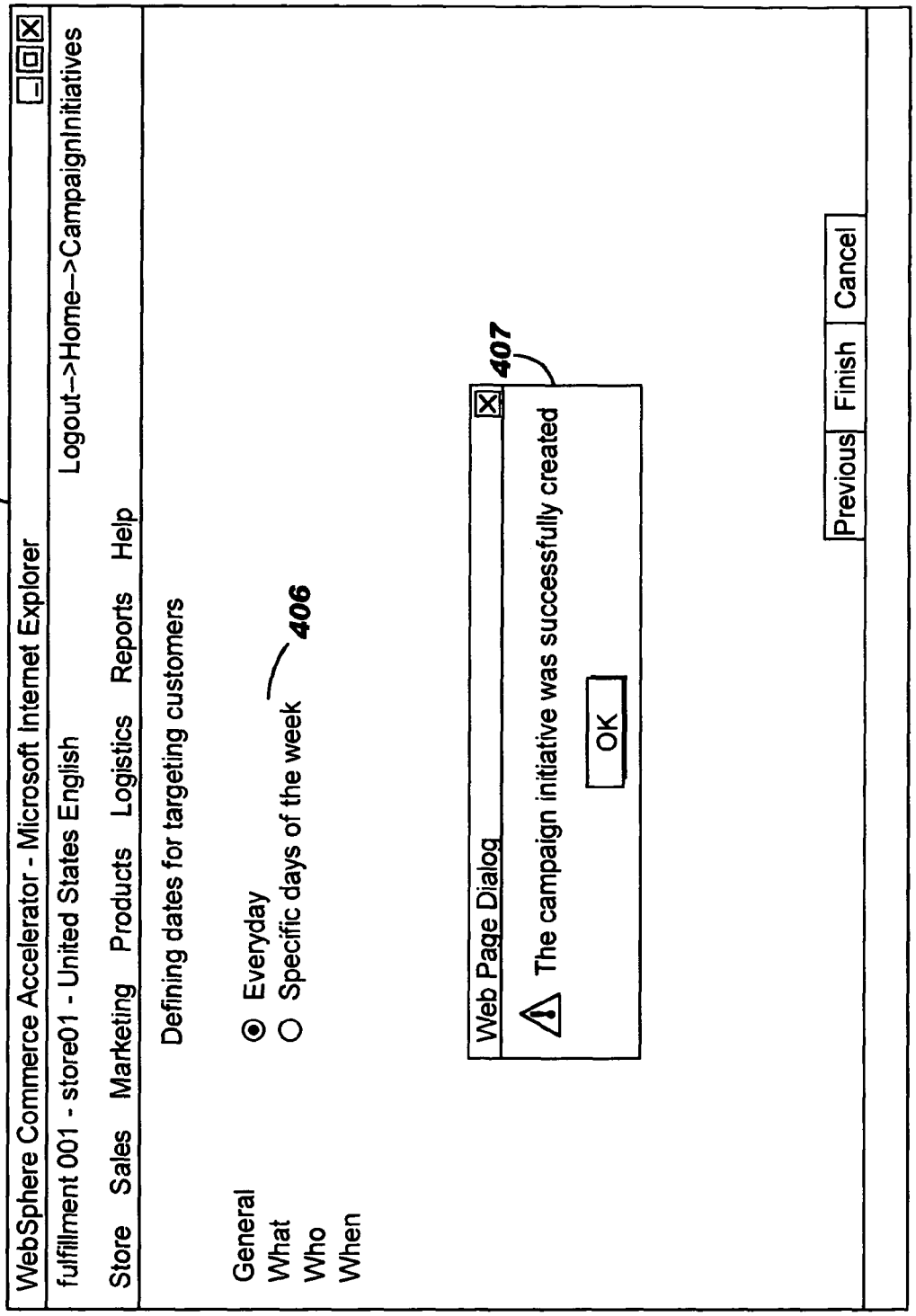

As illustrated in FIG. 5, an administrator of the system 200 (shown in FIG. 2) accesses a hosted store's campaign initiatives page 400 by logging on to the business logic module 205 and launching the campaign initiatives management GUI for a hosted store in order to select a campaign initiative from a campaign initiatives list 402 for that particular hosted store. Initially, there are no campaign initiatives listed in the campaign initiative field 404. Once a campaign initiative is chosen, as illustrated in FIG. 6, the administrator sets the duration of the campaign initiative in the duration field 406 and is subsequently prompted of the successful creation of the campaign initiative by way of dialog box 407. As shown in FIG. 7, the selected campaign initiative, or CampaignInHostedStore 408, is displayed in the campaign initiative field 404 upon successful creation. CampaignInHostedStore 408 appears in a specific e-marketing spot for the particular hosted store, during the selected duration. For instance, the CampaignInHostedStore 408 may include a campaign initiative directing the e-marketing spot 315 (shown in FIG. 3) of hosted store S1 310a (shown in FIG. 3) to display a banner announcing 10% discount on all merchandise offered at store S1 310a.

The campaign initiative field 404 includes a description of the CampaignInHostedStore 408, as well as the status, duration and the campaign the CampaignInHostedStore 408 belongs to.

Figure 9:
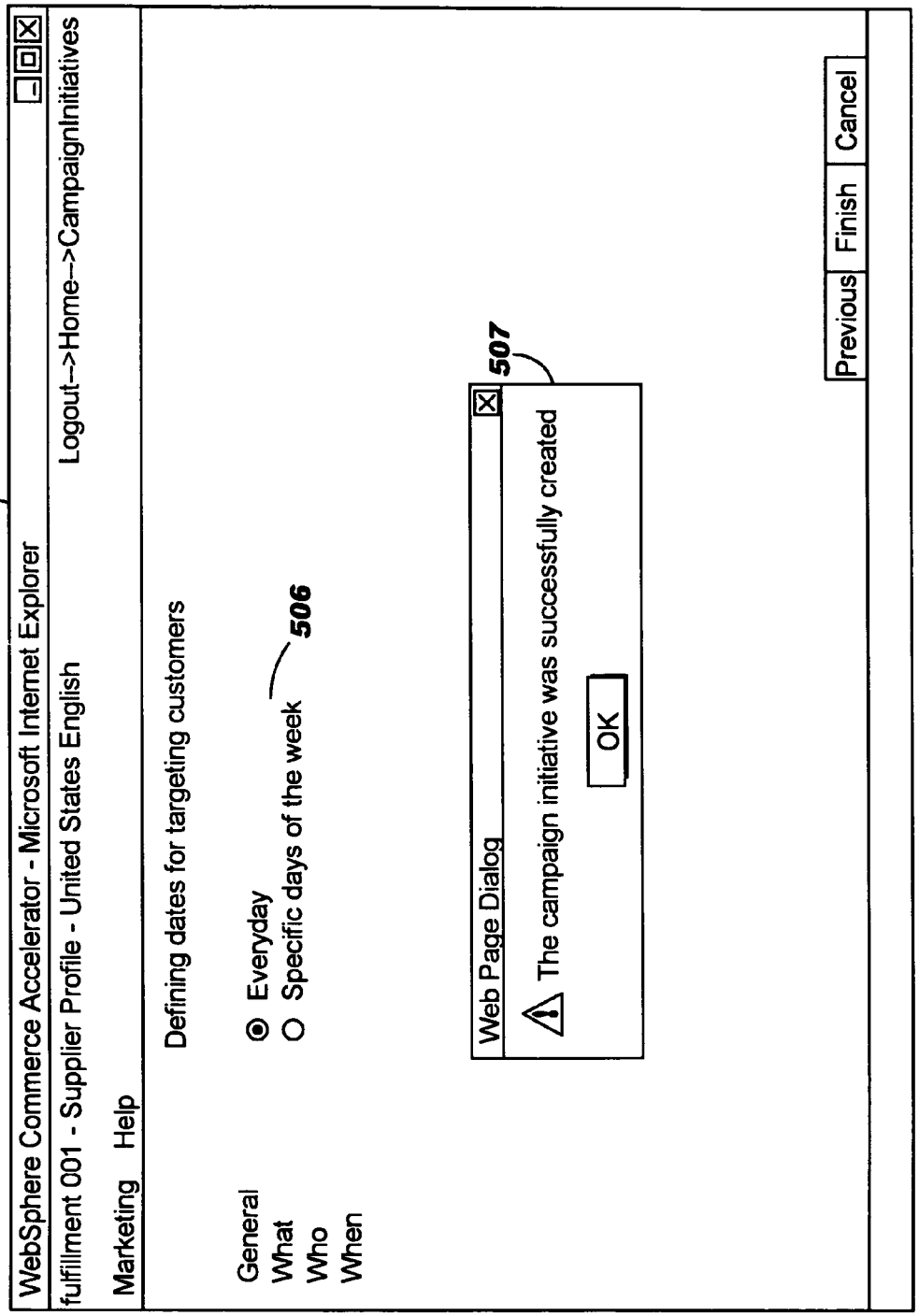

As indicated in FIG. 8, the administrator then accesses a profile store campaign initiatives page 500 by logging on to the business logic module 205 and launching the campaign initiatives management GUI for the profile store to create a campaign initiative for the profile store by choosing an appropriate campaign initiative from a campaign initiatives list 502 for the profile store 500. As illustrated in FIG. 9, a duration of the profile store campaign initiative is set to a desired period using a duration field 506. The administrator is prompted that the campaign initiative has been successfully implemented by way of a dialog box 507, as also shown in FIG. 9. FIG. 10 shows that once the appropriate campaign initiative has also been set up for the profile store 500, the campaign initiative appears as a CampaignInParentStore 508 in the campaign initiative field 504 for the profile store. The CampaignInParentStore 508 for the profile store appears in the e-marketing spots of all hosted stores. By way of example, the CampaignInParentStore 508 may include a campaign initiative causing all stores (S1 . . . Sn) 310 (shown in FIG. 3) to display an advertising banner in the e-marketing spots 313 (shown in FIG. 3) indicating launch of a new line of product by the manufacturer.

Referring still to FIG. 10, the campaign initiative field 504 of the profile store also includes a description of the CampaignInParentStore 508, as well as the status, duration and the campaign to which the CampaignInParentStore 508 belongs.

As shown in FIG. 11, both the CampaignInParentStore 508, as well as all campaign initiatives such as CampaignInHostedStore 408 for the hosted store appear in a campaign initiatives page 400 of that particular hosted store. However, the CampaignInParentStore 508 can only be modified in the campaign initiatives page 500 for the profile store. Only the CampaignInHostedStore 408 can be modified by hosted store owners or administrators. As shown in FIGS. 12 and 13, it is not possible to modify (FIG. 12), nor delete (FIG. 13), the CampaignInParentStore 508 from the campaign initiatives page 400 of a hosted store. As indicated by a dialog box 477 (shown both in FIGS. 12 and 13), it is not possible to delete or modify a campaign initiative from the hosted store. Accordingly, the campaign initiatives in campaign initiatives field 404 of a specific hosted store may be populated, deleted or modified, without affecting the campaign initiatives instituted for all hosted stores as defined in the generic store profile.

Figure 16:
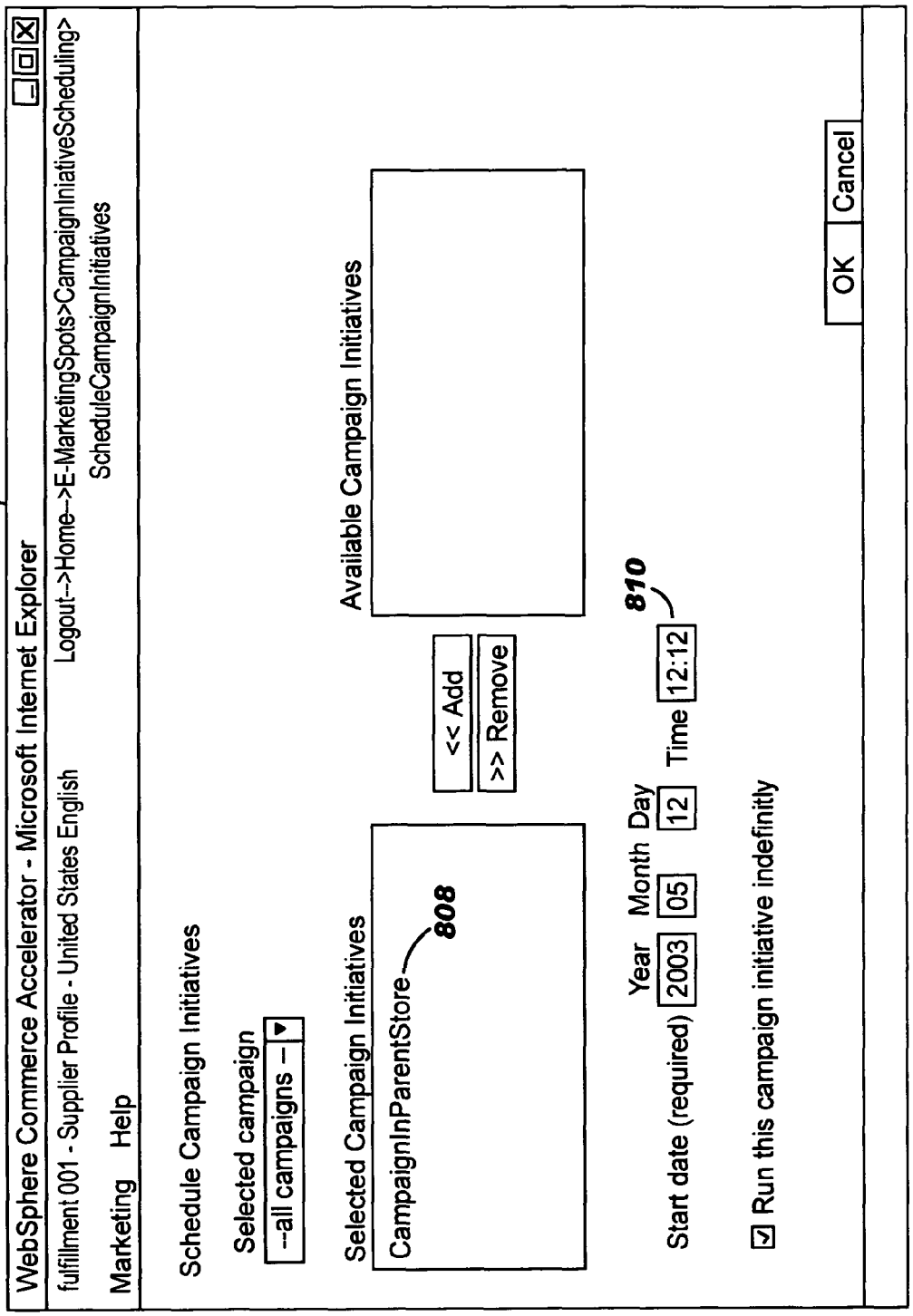

FIGS. 14 to 21 show screen shots illustrating the operation of the business logic module 205 (shown in FIG. 2) as a software product running on application server 204 (of FIG. 2), depicting the sequence of steps for setting up e-marketing spots in an exemplary marketing campaign. Referring to FIG. 14, there is shown a screen shot of an e-marketing spot page 600 for a profile store. As seen in the e-marketing spot page 600, an e-marketing spot EspotParentStore 608 has been created in the profile store and loaded into an e-marketing spot field 604. FIG. 15 shows a screen shot for a campaign scheduling page 700. In FIG. 15, a text line message 701 indicates that no campaign initiative has yet been assigned to the particular e-marketing spot 708. In FIG. 16, a new campaign initiative CampaignInParentStore 808 is created for the profile store in a profile store schedule campaign initiatives page 800. The CampaignInParentStore 808 is set to run indefinitely from May 12, 2003, starting at 12:12 as indicated by a schedule field 810. As illustrated in FIG. 17, the CampaignInParentStore 808 is now loaded in a campaign schedule field 704 of the campaign scheduling page 700, indicating a desired start date 706 and an end date 708.

Figure 19:
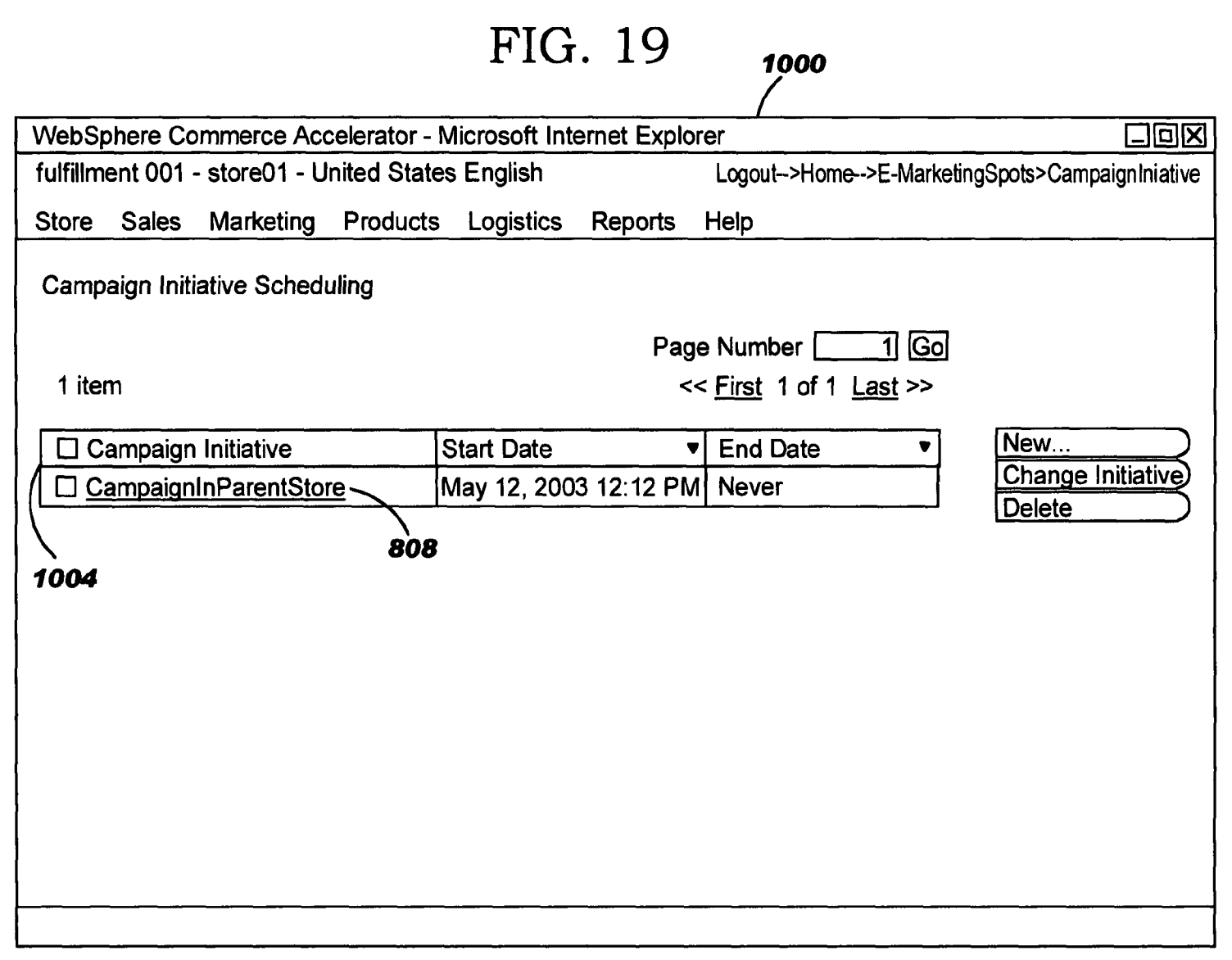
Figure 20:
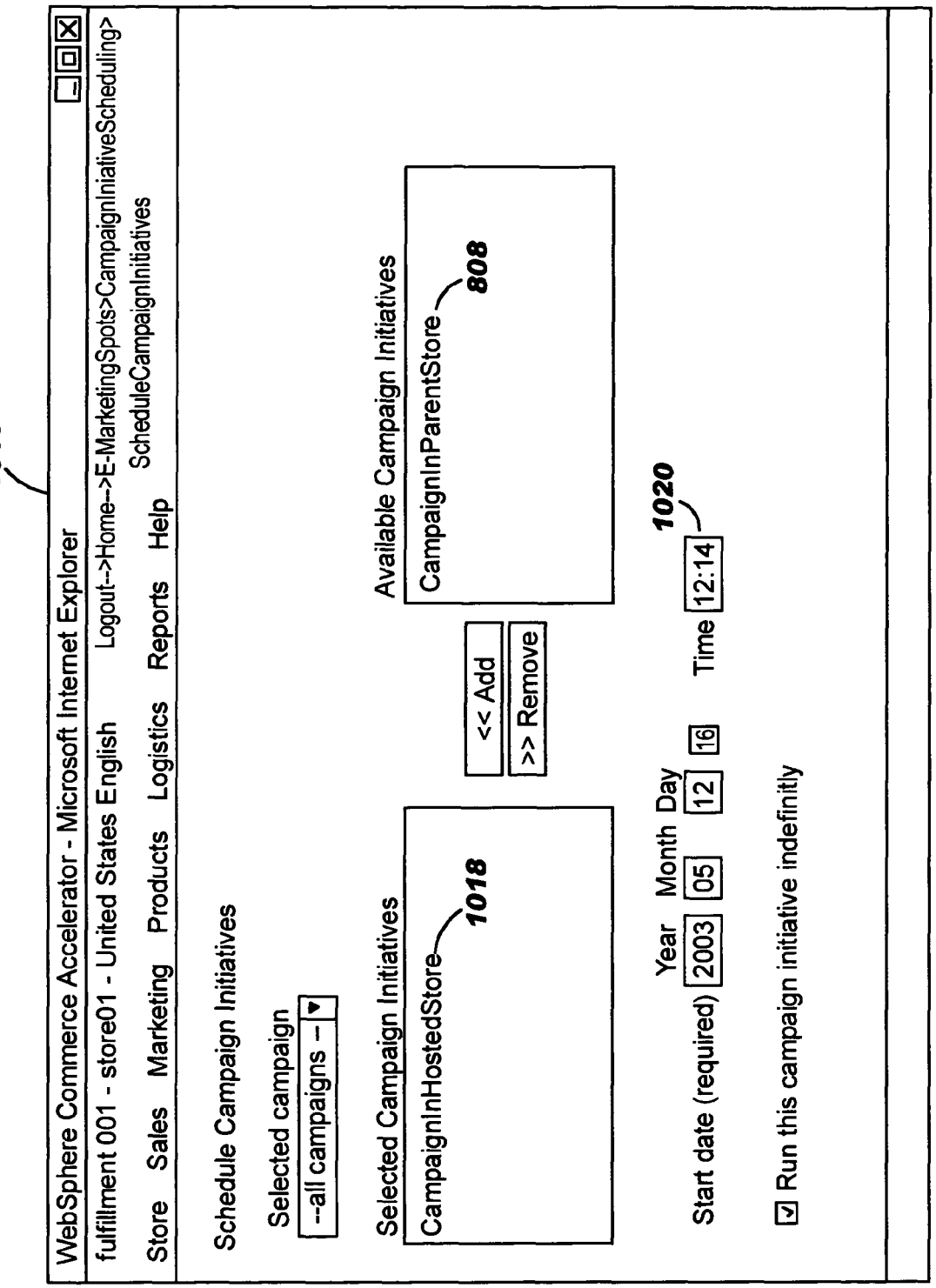
Figure 21:
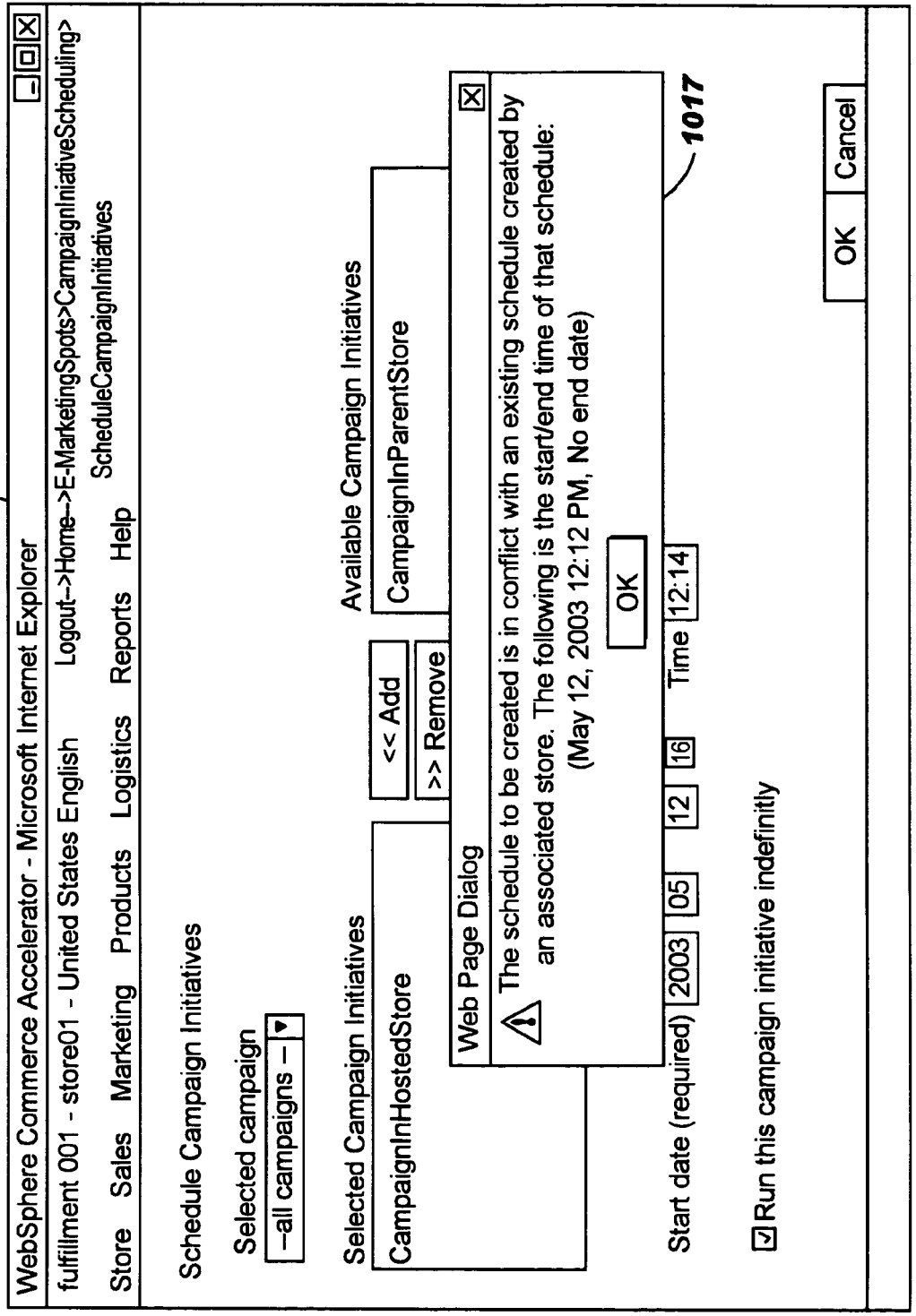

Turning now to FIG. 18, an e-marketing spot 900 is depicted for a hosted store having an e-marketing spot EspotParentStore 608 that has already been created in the profile store and loaded into an e-marketing spot field 904 of the hosted store. As shown in FIGS. 19 and 20, when accessing a campaign scheduling page 1000 for the hosted store, the CampaignInParentStore 808 appears in a campaign initiative field 1004. At this stage, the scheduler 308 (shown in FIG. 3) checks the existing campaign initiative CampaignInParentStore 808 to determine whether there exists a schedule conflict between the profile store campaign initiative CampaignInParentStore 808 and a new hosted store campaign initiative such as CampaignInHostedStore 1018 shown in FIG. 20. If no conflict is detected, the campaign initiative for the particular e-marketing spot in the hosted store can be successfully created. However, in case of a conflict, as illustrated in FIG. 21, it is not possible to create the new campaign initiative CampaignInHostedStore 1018 having a duration 1020 (shown in FIG. 20) in conflict with the CampaignInParentStore 808 in the schedule campaign page 1010 for the hosted store. Accordingly, the profile store campaign initiative CampaignInParentStore 808 in conflict with hosted store CampaignInHostedStore 1018 takes precedence over the hosted store campaign initiative. As shown in FIG. 21, the dialog box 1017 prompts the administrator of the schedule conflict between the profile store campaign initiative and the hosted store campaign initiative. As a result, the operation is not allowed and aborted.

It will be appreciated, by those skilled in the art, that the computer program product can be contained on a signal bearing medium having means for transporting computer readable code to a client/server system over a network, in which the code can be used to implement the method.

It will also be appreciated, by those skilled in the art, that the computer program product includes a computer readable medium having computer executable code or instructions for directing a client/server system to implement the method. The computer program product can also be called a computer-readable memory, in which the memory can be a CD, floppy disk or hard drive or any sort of memory device usable by a client/server system. It will also be appreciated, by those skilled in the art, that a client/server system may be configured to operate the method (either by use of computer executable code or instructions residing in a medium or by use of dedicated hardware modules, also generally or generically known as mechanisms or means, which may operate in an equivalent manner to the code or instructions which is well known in the art).

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

Furthermore, the foregoing detailed description of the embodiments of the present invention does not limit the implementation of the invention to any particular computer programming language. The present invention may be implemented in any computer programming language provided that the OS (Operating System) provides the facilities that may support the requirements of the present invention. Embodiments of the present invention may be implemented in the C or C++, COBOL, FORTRAN, Java™ or REXX computer programming language (or other computer programming languages in conjunction with C/C++). Any limitations presented would be a result of a particular type of operating system, computer programming language, data processing system, or database management system, and would not be a limitation of the present invention.

The invention claimed is:

1. For a client/server system having at least a client including a graphical user interface to display a content of virtual hosted stores to a user, the virtual stores being stored in databases managed by a database management system in a resource manager, the graphical user interface being operatively connected to an application server having a business logic module to select the content to be displayed, a method of managing the content of the hosted virtual stores comprising the steps of:

creating a profile store which serves as a template and upon which the hosted stores are formatted;

designating one or more e-marketing spots in the hosted stores;

setting up a marketing campaign for the hosted stores; and creating one or more campaign initiatives in the profile store for the content to be displayed in the hosted stores.

2. The method as set forth in claim 1, further comprising the step of creating one or more local campaign initiatives for the content to be displayed in the e-marketing spots of the hosted stores.

3. The method as set forth in claim 2, further comprising the step of modifying the local campaign initiatives in the hosted store.

4. The method as set forth in claim 2, further comprising the step of scheduling a time duration for the content to be displayed in the e-marketing spots of the hosted stores.

5. The method as set forth in claim 2, further comprising the step of checking for a schedule conflict between one or more of the campaign initiatives for the profile store and one or more of the local campaign initiatives for an e-marketing spot in a hosted store.

6. The method as set forth in claim 5, further comprising the step of choosing the campaign initiative over the local campaign initiative in case of a schedule conflict.

7. The method as set forth in claim 1, further comprising the step of modifying the campaign initiatives in the profile store.

8. A method for populating campaign initiatives, the method comprising the steps of:

accessing a list of pre-defined e-marketing spots for a profile store;

creating an e-marketing spot for said profile store by selecting said e-marketing spot from said list of pre-defined e-marketing spots;

accessing a first list of pre-defined campaign initiatives for said profile store;

creating a campaign initiative for said profile store by selecting said campaign initiative from said first list of campaign initiatives;

accessing a second list of campaign initiatives for a hosted store;

creating a campaign initiative for said hosted store by selecting said campaign initiative from said second list of campaign initiatives;

selecting said e-marketing spot created for said profile store to an e-marketing spot in said hosted store;

scheduling said campaign initiative created for said profile store to said e-marketing spot in said hosted store;

scheduling said campaign initiative created for said hosted store to said e-marketing spot in said hosted store; and rejecting said scheduling of said campaign initiative created for said hosted store if there is a conflict between said campaign initiative created for said profile store and said campaign initiative created for said hosted store.

* * * * *